(12) United States Patent
Ivy et al.

(10) Patent No.: US 8,950,181 B2
(45) Date of Patent: Feb. 10, 2015

(54) ENERGY STORAGE SYSTEM

(76) Inventors: Steven Thomas Ivy, Irving, TX (US); Guy Carl Eastwood, Garland, TX (US)

(*) Notice: Subject to any disclaimer, the term of this patent is extended or adjusted under 35 U.S.C. 154(b) by 1092 days.

(21) Appl. No.: 12/802,224

(22) Filed: Jun. 2, 2010

(65) Prior Publication Data
US 2010/0307147 A1    Dec. 9, 2010

Related U.S. Application Data

(60) Provisional application No. 61/184,515, filed on Jun. 5, 2009.

(51) Int. Cl.
*F16D 31/02* (2006.01)
*F03G 3/00* (2006.01)

(52) U.S. Cl.
CPC ........................................ *F03G 3/00* (2013.01)
USPC ............................................... 60/415; 60/398

(58) Field of Classification Search
USPC .................... 60/327, 398, 414, 415
See application file for complete search history.

(56) References Cited

U.S. PATENT DOCUMENTS

| | | | | |
|---|---|---|---|---|
| 3,996,741 | A | * | 12/1976 | Herberg .......................... 60/398 |
| 4,211,078 | A | | 7/1980 | Bass |
| 2006/0242954 | A1 | * | 11/2006 | Welch, Jr. ....................... 60/398 |
| 2009/0007558 | A1 | | 1/2009 | Hall et al. |
| 2009/0025379 | A1 | | 1/2009 | White |

* cited by examiner

*Primary Examiner* — Michael Leslie
(74) *Attorney, Agent, or Firm* — Robert E. Wise

(57) ABSTRACT

Energy can be stored by directing fluid into an expandable receptacle that has a relatively heavy mass above it. The fluid fills the receptacle such that it expands and lifts up the heavy mass above it. At a time when energy is needed, the fluid can be allowed to flow out of the receptacle and through a turbine or hydraulic motor to generate power or electricity. Intermittent or unreliable sources of power can be used to fill the receptacle, or power from a power grid can be used to fill the receptacle at times that are off-peak. During peak-load times, the potential energy of the fluid in the receptacle can be converted to power. The receptacle can also be used to control water flows and can provide a source of power and potable water to a community.

17 Claims, 8 Drawing Sheets

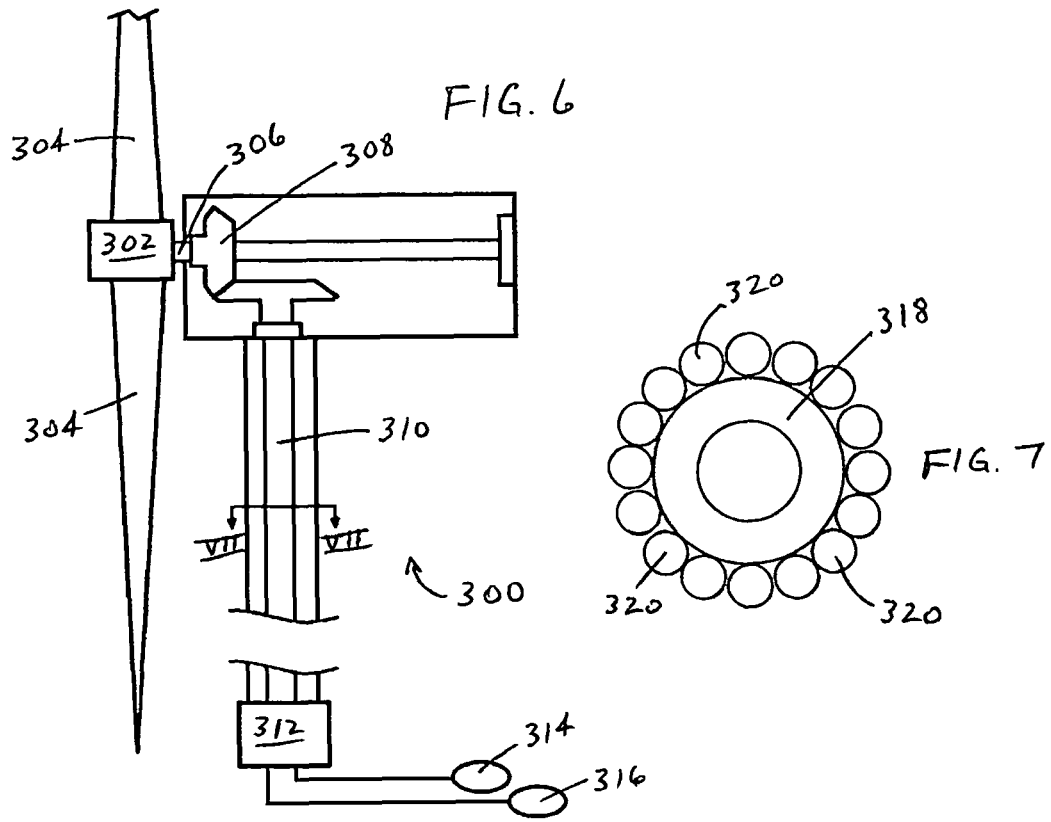
FIG. 6
FIG. 7
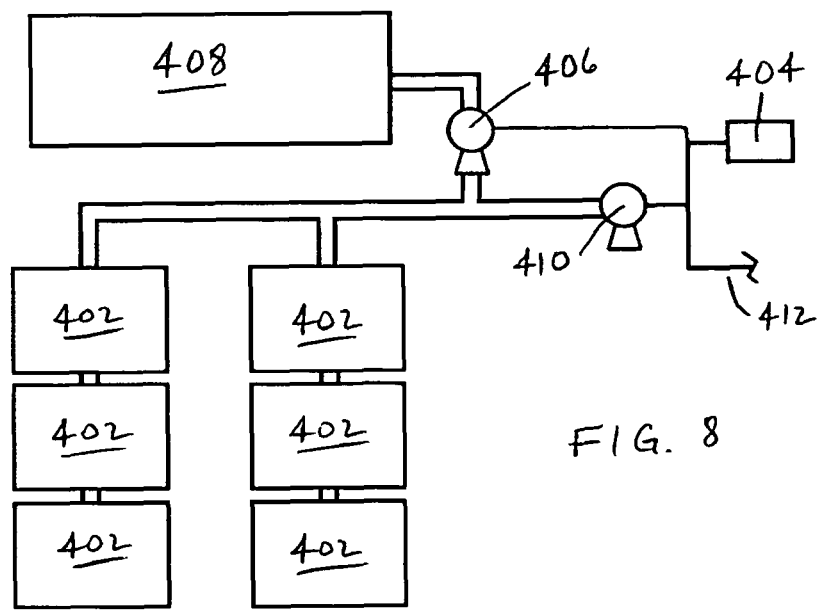
FIG. 8

ENERGY STORAGE SYSTEM

CROSS-REFERENCE TO RELATED APPLICATION

The present application claims the benefit of 35 U.S.C. section 111(b) provisional patent application Ser. No. 61/184,515 filed on Jun. 5, 2009 and entitled "Energy Storage System Utilizing Underground Bladder".

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION BY REFERENCE OF MATERIAL SUBMITTED ON A COMPACT DISC

Not applicable.

BACKGROUND OF THE INVENTION

The following disclosure relates to energy storage devices and, in particular, underground storage devices wherein a pressurized fluid is utilized as a means of storing energy.

In many instances, electric utilities operate large, efficient power generating plants to produce electricity at rate sufficient to meet a base load. However, when demand rises, these utilities may bring "peaking plants" online to meet the additional demand. Peaking plants are typically older, less efficient plants that cost more to operate. Thus, there exists a need for storing large amounts of energy in an environmentally friendly fashion. There also exists a need to store energy that can be captured from intermittent or unpredictable sources, such as wind energy. If wind energy can be stored, then it can reliably be used during times of peak demand.

BRIEF SUMMARY OF THE INVENTION

In one aspect thereof, a method of storing and retrieving energy includes injecting a compressible or incompressible fluid into a flexible underground bladder to store energy wherein fluid in the bladder is pressurized with overfill. The pressurized fluid in the bladder may be directed to one of a hydraulic motor, air motor or turbine to generate power.

An apparatus for storing and retrieving energy comprises an expandable receptacle that has a relatively heavy mass above it such that, when a fluid is pumped into the receptacle in a quantity sufficient to fill the receptacle and cause it to expand somewhat, the mass above the receptacle places the fluid in the receptacle under pressure. The apparatus for storing and retrieving energy further comprises a means for releasing the fluid in the receptacle upon command and causing the fluid to flow through a device that converts the power of the fluid flow to another form of power. For example, the fluid flow may be directed through a hydraulic motor that spins a turbine which, in turn, spins the rotor of an electrical generator and produces electrical power that can be transmitted to a transmission line or a device that uses electricity.

More specifically, an apparatus for storing energy and subsequently retrieving at least some of the stored energy, comprises an expandable receptacle at least partially disposed under overfill wherein the overfill places pressure on at least part of the receptacle; a source of fluid; a first conduit means for flowing the fluid from the source of the fluid to the receptacle; a pump means for pumping the fluid from the source of fluid into the receptacle such that the receptacle expands and lifts the overfill; a first valve means, disposed on one of the source of fluid, the first conduit means, and the receptacle, for alternatively flowing the fluid from the source of fluid into the receptacle or holding the fluid within the receptacle; a generator means for converting fluid flow to electrical power, wherein the generator means includes a means for transmitting the electrical power generated to a load; a second conduit means for flowing the fluid from the receptacle to the generator means to generate electrical power; and a second valve means, disposed on one of the receptacle, the second conduit means, and the generator means, for alternatively holding the fluid within the receptacle, or flowing the fluid from the receptacle to the generator means.

A method for of storing energy and subsequently retrieving at least some of the stored energy, comprises the steps of flowing a fluid from a source of fluid to an expandable receptacle, which receptacle is at least partially disposed under overfill, until the volume of fluid within the receptacle causes the receptacle to expand, wherein the fluid within the receptacle is pressurized by the weight of the overfill; maintaining the pressurized fluid within the receptacle until such time as the stored energy is to be retrieved, and subsequently flowing the fluid from the receptacle to a generator means for converting fluid flow to electrical power; and transmitting the electrical power generated by the generator means to a load.

Another method of storing energy and subsequently retrieving at least some of the stored energy, comprises the steps of covering a collapsed flexible bladder with an overfill; subsequently, pumping a fluid into a bladder in an amount sufficient to place the fluid in the bladder under pressure higher than the ambient pressure; subsequently, allowing the pressure on the fluid in the bladder to pump the fluid out of the bladder; and directing the fluid pumped out of the bladder through one of a turbine, a Pelton Wheel, a hydraulic motor, or a similar device.

A means for storing wind energy comprises a means for converting wind energy into rotational energy; a means for converting the rotational energy into electrical energy; a means for converting the rotational energy into the pumping of a fluid from a reservoir into an expandable receptacle which has a substantial mass disposed on top of the receptacle; and a means of, upon command, flowing the fluid from the expandable receptacle and through a means for converting the fluid flow to power.

An apparatus for storing energy and subsequently retrieving at least some of the stored energy comprises a relatively large mass; a cavity in the ground, the cavity having generally vertical cavity wall(s); plural vertical rail tracks on one of the mass or the cavity wall(s) and plural rail wheels on the other of the mass or the cavity wall(s), such that the rail wheels cooperate with the rail tracks thereby allowing the mass to rise or descend in the cavity with relatively little friction; plural hydraulic jacks or hydraulic cylinders with extending pistons, disposed at the bottom of the cavity, upon which the mass rests; means for extending the pistons of the jacks, thereby raising the mass within the cavity; means for holding the mass in its raised position; and means for generating power when the mass is allowed to lower by releasing the hydraulic fluid in the jacks.

A method of making a means for storing energy and subsequently retrieving at least some of the stored energy comprises the steps of creating a relatively large chamber underground; making the floor and ceiling of the underground chamber relatively smooth; placing footings on the floor and at least one ceiling plate on the ceiling of the underground chamber; placing plural hydraulic pistons in the underground chamber onto the footings and flowing a fluid into each piston to extend all the pistons so as to hold up the ceiling plate; boring at least three wells from the surface above the underground chamber down into the chamber, such that the wells define a large block within the ground above the chamber; mounting rail tracks to one side of each of the wells and cooperating rail wheels to the other side of the wells, and securing them all to the walls of the wells; cutting completely through the ground between the wells from the surface to the top of the chamber, thereby creating a monolith that rests on the ceiling plate of the underground chamber and which can move up and down along the cooperating rail tracks and rail wheels; and providing a means for flowing the fluid in each piston out of said piston and through a means for converting fluid flow to power, and a means for pumping fluid back into the pistons.

A means for controlling moving water comprises a large expandable receptacle having at least one means for flowing water in and out of the receptacle, wherein the receptacle is disposed adjacent one side of the stream of water; an overfill disposed on top of the expandable receptacle; plural interlocking blocks disposed on top of or within the overfill, each of the blocks having at least one hole through them; at least one cable laced through the holes of plural blocks wherein at least one end of each cable is attached to a means for anchoring the cable to the ground; and a means for pumping water into the expandable receptacle, and a means for either holding the water within the receptacle or allowing it to flow out of the receptacle.

A means for supplying local residents with both water and electricity during a power outage, wherein water is pumped into a relatively large flexible bladder disposed underground whereby the ground over the bladder pressurizes the water in the bladder, and then the water is subsequently released from the bladder during a time of local power outage, and the released water is first directed through a turbine to generate electrical power and is then directed into the local water distribution system.

An apparatus for making a large flexible bladder at the location where it will be used comprises two parallel twin-rail tracks wherein the two tracks are separated by a distance somewhat more than the width of the bladder to be constructed; a first and a second rail car with rail-wheels for engaging the twin-rail tracks, wherein the first rail car is disposed on one twin-rail track and the second rail car is disposed on the other parallel twin-rail track; a relatively tall superstructure mounted on each of the first and second rail cars; a gantry with two ends, the first end of the gantry attached near the top of the superstructure of the first rail car and the second end of the gantry attached near the top of the superstructure of the second rail car; at least one nozzle means for spraying a polymer, or a combination of polymer and binder, disposed on the gantry; and at least one reel means, disposed on the gantry, for laying down one of a long filament and a mesh.

BRIEF DESCRIPTION OF THE SEVERAL VIEWS OF THE DRAWINGS

For a more complete understanding, reference is now made to the following description taken in conjunction with the accompanying drawings in which:

FIG. 6 is a schematic representation of a second wind powered energy generation and storage system according to the disclosure;

FIG. 7 is a cross-section of a shaft for use with the wind powered energy generation and storage system of FIG. 6.

FIG. 8 illustrates a energy storage system utilized multiple, inter-connected bladders.

DETAILED DESCRIPTION OF THE PREFERRED EMBODIMENTS OF THE INVENTION

Although the preferred embodiments are described in detail, it should be understood that various changes, substitutions and alterations can be made therein without departing from the spirit and scope of the invention as defined by the appended claims.

Figure 1:
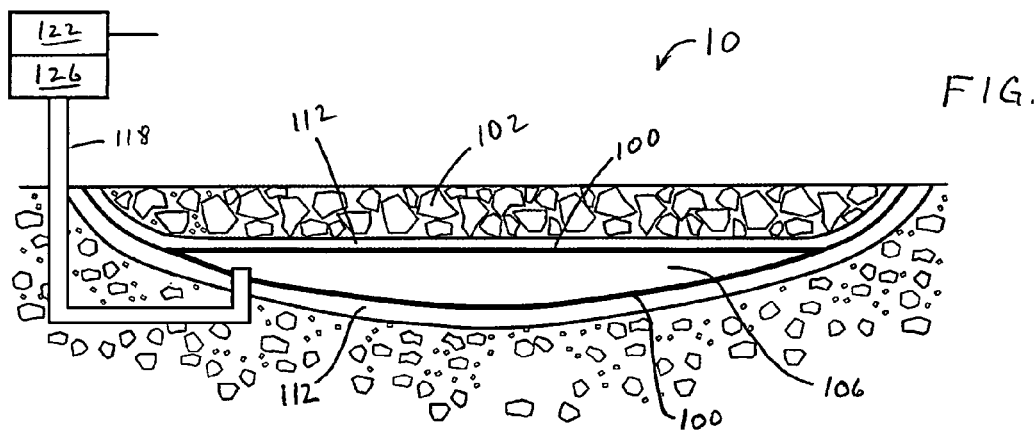
FIG. 1 is a partial cross-sectional view of an energy storage system according to the disclosure, showing the bladder deflated.
Figure 2:
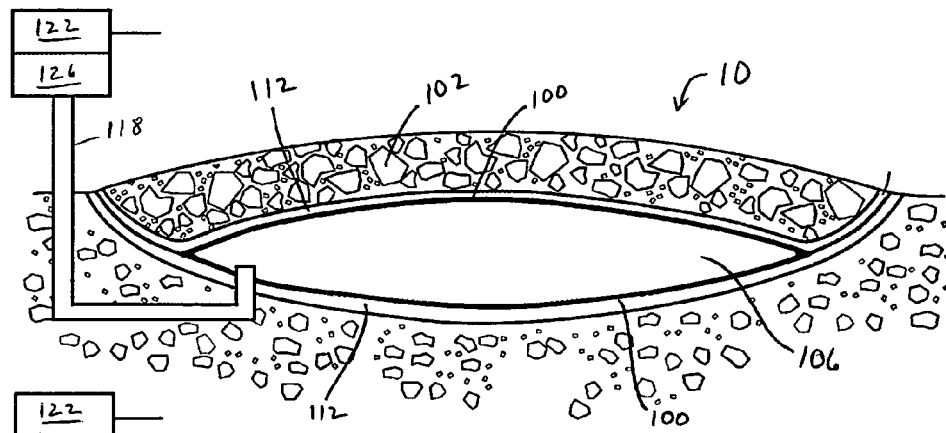
FIG. 2 is a partial cross-sectional view of an energy storage system according to the disclosure, showing the bladder inflated.
Figure 3:
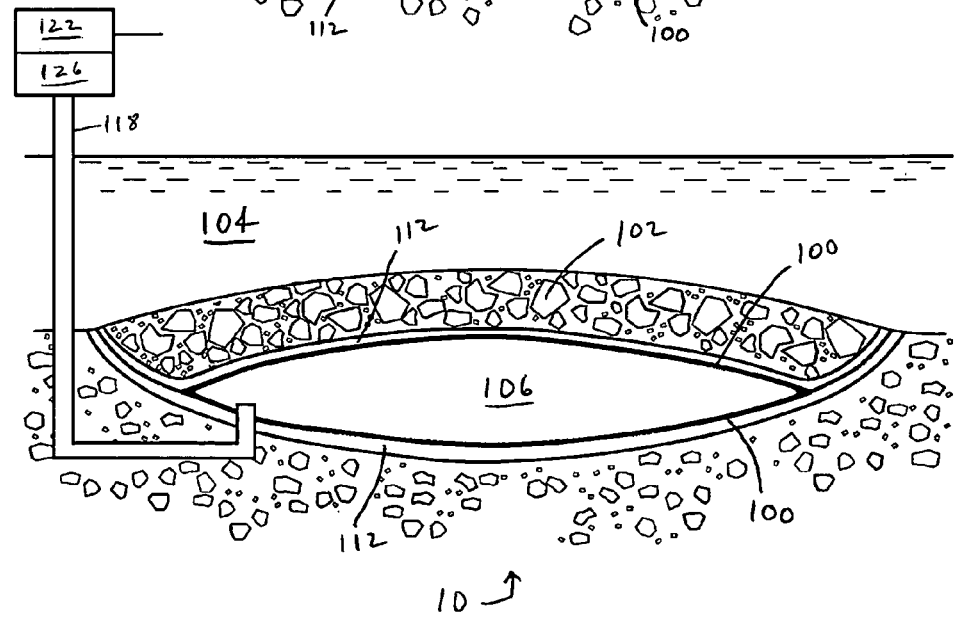
FIG. 3 is a partial cross-sectional view of an energy storage system according to the disclosure, showing the bladder inflated.

Referring to FIGS. 1-3, a system 10 for storing energy includes a buried flexible bladder 100 that may be used as used as an energy storage device. A layer of sand 112 may be disposed over the top and under the bottom of the bladder 100. This layer of sand 112 serves to cushion the bladder 100 to some extent and tends to protect the bladder 100 from being punctured by relatively sharp rocks that might be disposed in the surrounding strata. However, the layers of sand 112 are not critical to this invention and can be omitted.

In one embodiment, shown in FIGS. 1 and 2, bladder 100 is covered with a relatively thick overfill 102 of earth, stones, or any other material with substantial mass. In another embodiment, shown in FIG. 3, bladder 100 may be submerged under a body of water 104 with or without an overfill 102 of solid mass. The weight of overfill 102 and/or water 104 above the bladder 100 pressurizes a fluid 106 stored in the bladder 100. If the fluid is compressible, or if a gas was pumped into the bladder 100, then filling the bladder itself may pressurize the compressible fluid or gas. The depth and amount of overfill 102 may be selected based upon the desired maximum pressure in bladder 100. It is contemplated that bladder 100 will be large, potentially having a surface area of one to five acres or more. It is also contemplated that a series of interconnected bladders 100 may be used in a system 10. One or more bladders 100 may be located adjacent a reservoir or other source of fluid 106 such as a storage tank, lake, river, cooling pond or stream.

In this specification, the term "overfill" can be any substance or combination of substances that have substantial mass. Examples include, but are not limited to, earth, dirt, sand, clay, rock, stones, bricks, concrete rubble, brick rubble, construction rubble, scrap metal, garbage, crude oil, snow, and water, or any combination thereof. In this specification, the description of this invention usually refers to a "bladder". It should be understood that the word "bladder" is not limiting to this invention or any embodiments thereof. Any flexible or expandable receptacle or container could be used in the place of the stated bladder. It is only necessary that it serve the same purpose.

Fluid 106 may be a compressible fluid such as air or nitrogen or incompressible fluid such as water or hydraulic oil. In those instances where a large water source is not available, a compressible fluid such as air or nitrogen may be used as fluid 106. There could be a combination of incompressible fluid and compressible gas used to fill the bladder 100. In the case of an incompressible liquid such as water the energy will be stored almost entirely in the form of gravitational potential energy due to the weight of overfill 102 stacked on bladder 100. If a compressible fluid such as air or nitrogen is used as fluid 106, the energy may be stored both as gravitational potential energy by supporting the weight of overfill 102 and as the potential energy of a compressed gas. In the case of a compressible fluid, the energy of enthalpy due to compression or expansion of large quantities of compressible fluid may be recovered and used for cooling or as a heat source, as the case may be. In either case, (e.g. compressible or incompressible fluid) system 10 may be viewed as a type of mechanical or gravitational battery in that it stores energy that can be used at a later time.

Referring still to FIG. 1, a source of fluid (not shown) supplies the fluid 106 that can flow into or out of the bladder 100. Electrical power from a source 120 such as the electrical power grid, an electrical generating plant, wind turbine, or solar cell can be used to power pump 122 to inject a fluid 106, such as water, though a pipeline 118 into bladder 100 under pressure. As fluid 106 enters bladder 100, the bladder expands from a minimum volume where the bladder is collapsed or semi-collapsed (as designated Zmin-earth) and may be expanded to the position designated Zmax-bladder. As bladder 100 expands, it lifts the mass of overfill 102 against gravity. The system will store the energy required to lift overfill 102. It is not necessary that the bladder be completely filled to capacity (Zmax). Any filling that lifts the overfill to some extent and places the contents of the bladder under pressure will suffice. In one embodiment, power from a source 120 such as a generating station is used during off-peak load periods to inflate bladder 100 with fluid 106.

Although, as illustrated, bladder 100 has a generally oblong cross-section, in other variations the cross-section may be rectangular, cylindrical or any different geometry, depending upon the particular application. Any conceivable shape or size of bladder can be used in this invention. In one embodiment, the elevation of bladder 100 is varied or sloped along its length to prevent the bladder from collapsing in the center and blocking flow as fluid is recovered from the bladder. In yet other embodiments, one or more pipes (not shown) connected to the bladder inlet or outlet may be provided to prevent bladder 100 from collapsing and blocking fluid flow and/or from fully inflating.

When needed, for example during full-load periods, the energy used to inflate bladder 100 may be recovered. Fluid 106 from bladder 100 is directed through a hydraulic motor 124 or similar device to drive a generator to produce electricity. The electricity produced by generator may be transmitted back to generating source 120 or transmitted directly to consumers through a transmission line, or it could be used for an immediate local purpose. There may be multiple possible uses for the potential energy contained in the inflated bladder, and there can be a means for choosing a particular use at a particular time. Thus, bladder 100 may serve as a means of storing electricity generated during off-peak periods that may be recovered during full-load periods. This, in turn, may preclude the necessity to bring less efficient "peaking" plants that are typically used when electric demand exceeds the capacity of larger, more efficient generating plants.

In other embodiments, fluid 106 from bladder 110 may be used to power hydraulic-powered machinery. In the case where bladder 100 is pressurized with air, pressurized air from the bladder may be used directly to power pneumatic tools, an air motor or other pneumatically powered devices. The energy needed to pump fluid 106 into bladder 100 can come from one or more various sources including conventional and unconventional power sources such as wind, solar, geothermal, coal, natural gas, nuclear, tidal, wave and ocean currents. One of the advantages of system 10 is that the system may store energy from intermittent, sometimes unpredictable, power sources and potentially allow the discontinuation of using inefficient power sources such as "peaking power plants" which may be older and less environmentally friendly.

For example, one intermittent and/or unpredictable energy source is the wind power. Currently, due to the lack of a genuine large-scale energy storage system, if a peak wind event occurs during off-peak hours (e.g. high winds with the potential to generate substantial amounts of electricity), much or all of the energy potential may be wasted. In situations where the demand is low and the potential for generation is high, the turbine blades of a wind generator may be simply tapered to reduce the energy produced. By using this invention, it will be possible to store the energy generated during this intermittent and/or unpredictable energy source, such that the stored energy could be recovered and used at a later time when it is needed.

Alternatively, if a peak wind event covers a large area because many wind turbines are simultaneously producing large amounts of power, even if the wind event coincides with peak power demand hours, the grid power limits may not be capable of transmitting the available power. Consequently, the power output of some of the turbines may need to be reduced to avoid overloading the available transmission lines extending from the turbine locations to heavy load areas. Thus, the deployment of storage systems 10 may reduce the incidence of "peak" and "off peak" periods such that there will be a relatively constant average or the base load. The deployment of storage system 10 may also reduce concerns regarding the use of alternative energy sources such as wind, solar and tidal by providing sufficient energy storage capacity to insure that energy is available on demand from these sources.

In operation, the empty or relatively empty bladder 100 shown in FIG. 1 can be filled with a fluid that is pressurized by the overfill 102 shown in FIG. 2, or by the body of water 104 (with or without a layer of overfill 102 between the bladder and the body of water) shown in FIG. 3. Filling is accomplished by using a cheap or off-peak source of power to pump the fluid 106 into the bladder 100. At a later time, when power is needed, the fluid 106 in the bladder can be released and allowed to flow under pressure out of the bladder. The pressure is caused by overfill 102 pressing on the bladder 100. The pressurized flow of fluid exiting the bladder can be used to generate power as is well-known in this art. This process can be repeated indefinitely.

Figure 4:
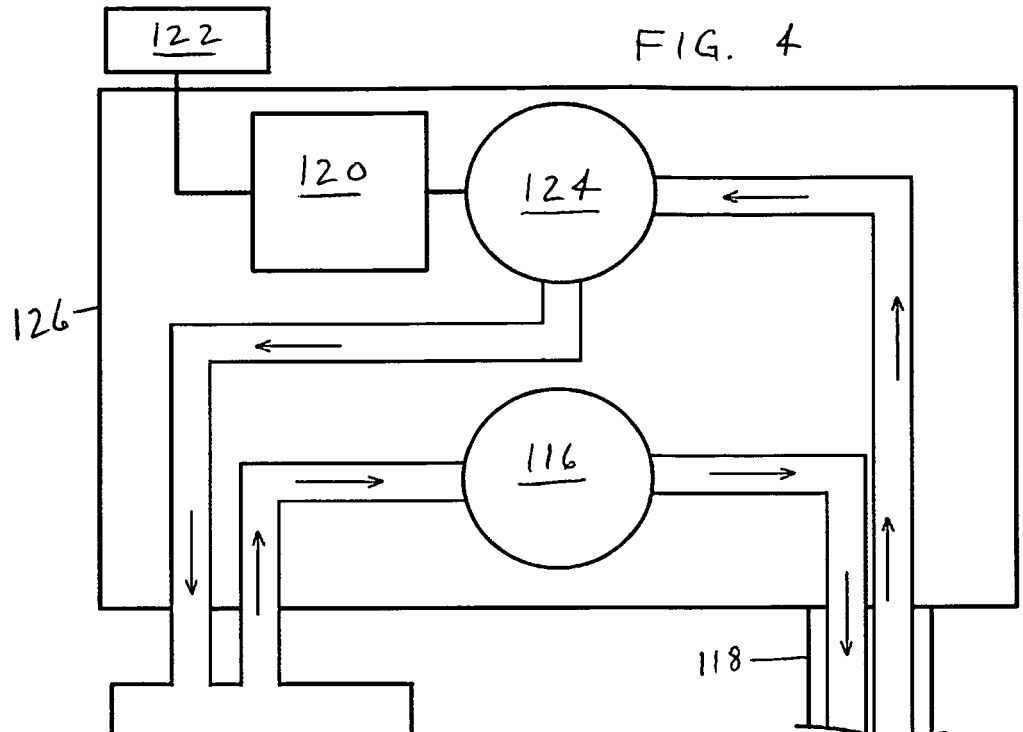
FIG. 4 is a schematic diagram of the fluid control system for FIGS. 1-3.

FIG. 4 shows how the fluid can be pumped into the bladder and then used to generate power as it flows out again. A reservoir 115 of a fluid, such as water, is accessed by a pipe or other fluid conduit and a pump 116 pumps the fluid from the reservoir 115 to a bladder similar to or identical to bladder 100 described above. This is seen as the fluid flowing down the left pipe of conduit 118 in FIG. 4. The fluid pumped into the bladder fills it until the overfill above the bladder is raised somewhat. The fluid may be held in the bladder for any period of time. When desired, the water can be released from the bladder, for example with a valve, and the gravitational pressure of the overfill above the bladder will force the water out of the bladder and into an exit pipe connected to the bladder. This pipe is shown on the right in conduit 118 with the fluid flowing upwards in FIG. 4. As shown in FIG. 4, the water is directed through a turbine or hydraulic motor 124 or similar device which drives generator 120 in a known manner. The rotational energy of the hydraulic motor can be converted to electricity by the generator 120. The electricity produced by generator 120 can be directed to the power grid 122 or to any other device that runs on or stores electricity. After passing through the hydraulic motor 124, the fluid is directed by a pipe back into the reservoir 115. Alternatively, the fluid can be directed to any other location where it is desired after passing through the hydraulic motor 124. The pump 116, the hydraulic motor 124, and the generator 120 are shown within box 126 for the purpose of illustration in FIGS. 1-3.

Figure 5:
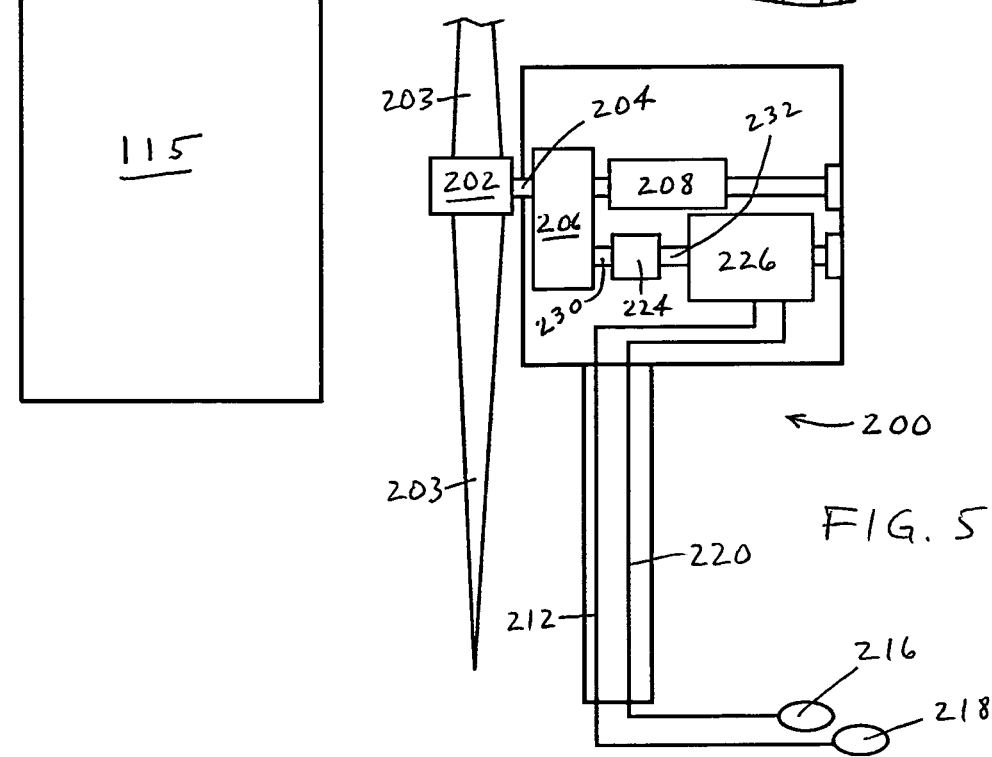
FIG. 5 is a schematic representation of a wind powered energy generation and storage system according to the disclosure.

Referring to FIG. 5, in one embodiment, an electric wind generator 200 is equipped with a rotor 202 having a plurality of blades 203 wherein the rotor 202 is connected to a transmission 206 by means of a first shaft 204. Blades 203 of rotor 202 may be variable pitch type blades as is known in the art. Transmission 206 rotationally drives an electrical generator 208 which generates electricity. The electricity generated by the generator 208 can be directed to anything that utilizes electricity.

There is also a second shaft 230 connected to the transmission and turned by the rotation of rotor 202, in the same manner as shaft 204. The second shaft 230 is rotationally connected to a clutch mechanism 224 which can engage or disengage the rotation of the second shaft 230 to or from a third shaft 232 that is rotationally connected to a hydraulic motor 226 or similar device. The hydraulic motor 226 is connected by a pipe 212 to a bladder 218 that is similar to or identical to the bladder 100 described above. The hydraulic motor 226 is also connected by a pipe 220 to a reservoir 216 which contains a fluid, such as water.

When shafts 204, 230, and 232 are turned, as when wind turns rotor 202 and the clutch 224 is engaged, the hydraulic motor 226 is caused to pump the fluid from reservoir 216 through the hydraulic motor 226 and to the bladder 218 which causes the bladder 218 to fill. When the bladder 218 is filled, the clutch 224 can be disengaged, so that the turning of rotor 202 will not turn shaft 232 and the hydraulic motor 226 does not operate. In this mode, wind turns the rotor 202 and generates electricity, but the hydraulic motor 226 is not operating. It may also occur that there is no wind or insufficient wind, and there is no current need for electricity to be generated, as in off-peak times, so none of the shafts will turn.

At a time when there is no wind, or insufficient wind, and power needs to be generated, the clutch 224 can be engaged, and the bladder's valve (not shown) is opened to allow the fluid in the bladder 218 to flow up pipe 212 and through the hydraulic motor 226 causing shafts 232 and 230 to turn, which causes the generator 208 to generate electricity. The water flowing through the hydraulic motor 226 from the bladder 218 then flows through pipe 220 to the reservoir 216.

The particular arrangement of mechanisms that accomplish the results described for the device shown in FIG. 5 is only one example. Persons of ordinary skill in this art can design similar systems that utilize the teachings of this invention and accomplish the same or similar results. This invention is not limited to the example shown in FIG. 5.

Turning to FIG. 6, in another embodiment, a wind power pump assembly 300 includes a rotor 302 having a plurality of fixed or variable pitch blades 304. Rotor 302 is linked to a transmission 308 with a shaft 306 that rotates with rotor 302. Transmission 308 is coupled to a hydraulic pump 312 by means of a rotating shaft 310. Hydraulic pump 312 pumps a fluid from a reservoir 314 to a bladder 316 similar or identical to bladder 100 of FIG. 1. The pressurized fluid stored in bladder 316 may then be used to drive a generator (not shown) to produce electricity, power hydraulic equipment, or serve as a water source for a municipality or other consumer.

Referring to FIG. 7, in one embodiment, shaft 310 may have a composite structure. For example, in one variation, shaft 310 may include a hollow ceramic core 318 surrounded by a plurality of high strength steel or plastic cables 320. Depending upon the length of shaft 310 and the mechanical load on the shaft, different types of shafts and materials may be used.

Turning to FIG. 8, an energy storage system 400 includes a series of interconnected bladders 402, which may be buried as illustrated in FIG. 1 and/or submerged beneath a body of water. The bladders 402 are all interconnected by pipes or other fluid conduits, such that all bladders can share the fluid that fills them all. Power from an electrical energy source 404, such as a coal or gas-fired generating plant during off-peak periods (e.g. when demand is less than capacity), is utilized to drive one or more pumps 406 to pump water from reservoir 408 into bladders 402. In one embodiment, each of bladders 402 covers a surface area of approximately three acres to maximize energy storage capacity. During peak demand periods, water from bladders 402 is directed to a generator 410 to produce electricity that is transmitted back to electrical energy source 404 and/or directly to a transmission line 412 for distribution to consumers.

Figure 9:
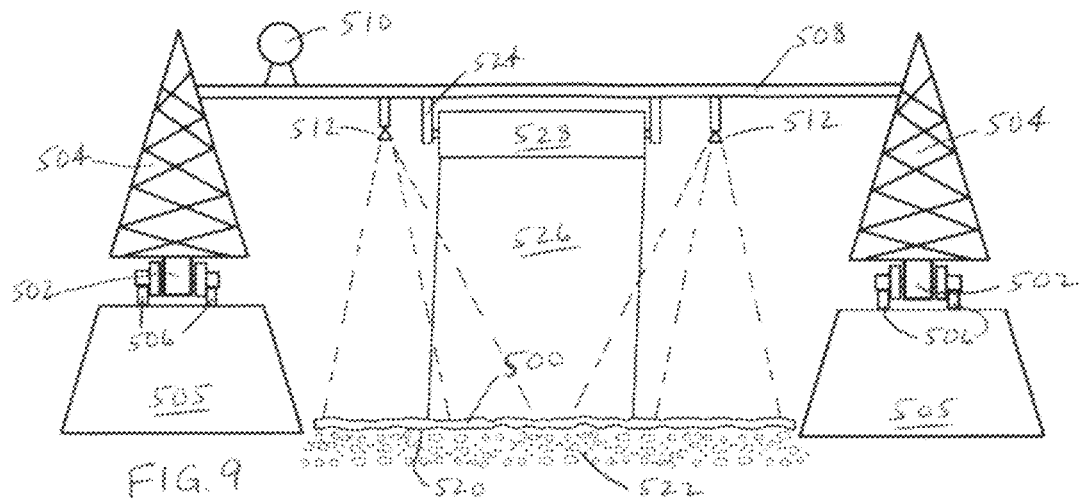
FIG. 9 illustrates one method of constructing a bladder for use with an energy storage system according to the disclosure.

Referring now to FIG. 9, in one embodiment, a bladder 500 similar to or identical to bladder 100 of FIG. 1 can be formed using twin laser guided rail cars 502 with tall derricks 504 mounted on the cars. Cars 502 travel along parallel rails 506 across the location where bladder 500 is to be formed. The rails may sit on the ground as do railroad tracks, or they can be elevated somewhat on support structures 505, as is shown in FIG. 9. A cable or gantry 508 extends between the twin derricks 504. In one variation, a reel mechanism 510 and one or more liquid plastic spray dispensing nozzles 512 are mounted on cable or gantry 508. The reel mechanism is connected to each nozzle 512 and can cause the nozzles to move back and forth across the cable or gantry 508. Reel 510 are connected to nozzles 512 and are operable to move the nozzles 512 across the location where bladder 500 is to be formed, laying out a pattern of reinforcing fibers 514 and a spray-able suitable plastic material 516 in a manner similar to raster scan. There could be plural reels similar to reel 510 disposed on the gantry 508 and they could be arranged to translate back and forth across the gantry as it moves along the rail tracks 506. The nozzle may spray, from a tank or other suitable reservoir, either a pure polymer liquid or a polymer liquid with suspended fibers. There could also be additional reels on the gantry 508 that reel out individual fibers onto the forming bladder or mats of woven fibers, either of which would help strengthen the bladder once formed.

Once the surface or ground where the first layer 520 of the membrane forming bladder 500 is to be placed has been prepared, flattened on a thick bed 522 of soft packed sand or clay, the raster scan will first spray down a sealant layer and then layers of puncture resistant plastic intermeshed with strengthening fibers or rolls of cloth. A film dispensing device 524 may also be used to place strips of a suitable film 526 from a roll 528 of a selected film over the area where bladder 500 is to be formed. The strips of film 526 may then be thermally or solvent-welded together as is known in the art. In this manner, it is possible to automate and speed the manufacture of some or all of the very large bladders on site since the bladders may be too large to manufacture offsite and/or ship to the site where the bladder or bladders are to be located.

Figure 10:
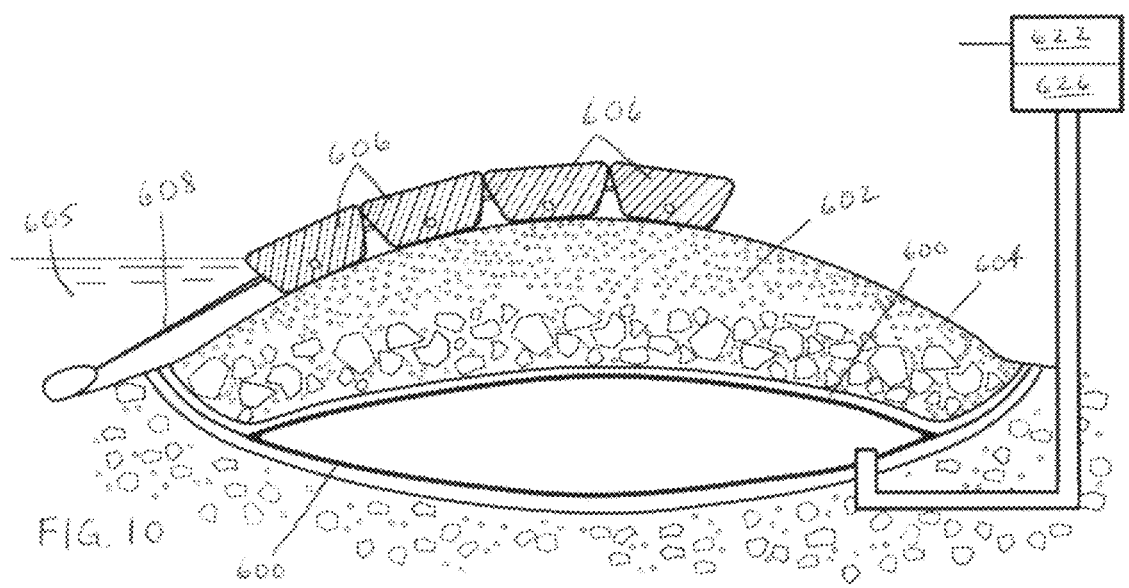
FIG. 10 illustrates a configuration of an energy storage bladder of the disclosure used as a dam or levee.

Referring now to FIG. 10, in another embodiment of this invention, a bladder 600 similar to, or identical to, bladder 100 of FIG. 1 may be configured as a levee, breakwater or containment dam for a lake, river, stream or cooling pond. In this case, the bladder 600 would usually be kept full or near full. In this embodiment, bladder 600 may be used to keep a river flowing in its desired bed, or a lake in its basin. This usage could extend to controlling the flow of any fluid in any fluid stream. In the event of flooding or threatened flooding, bladder 600 may be drained to allow a controlled emergency release of water before the lake or river overflows into an unpredictable area. In order to retain bladder 600 in position, the bladder may need to be armored and anchored in position.

In FIG. 10, when bladder 600 is utilized as a levee or as a dam, keeping the bladder in place and keeping it physically intact during the rigors and impacts of daily use, and especially during a flood, may require a shield between the bladder and the floodwaters 605. A cushion 602 of sand, plastic or backfill material, along with steel netting or mesh 604, may be used to cushion and retain bladder 600 in place. Additionally, a series of large interlocking concrete tiles or blocks 606 may also be utilized to retain bladder 600 in place and to prevent debris from directly contacting the membrane of bladder 600. The system shown in FIG. 6 can have a system similar to or the same as that shown in FIG. 4 to fill the bladder and capture energy when the fluid is released. This system is designated 624 in FIG. 10 and it can provide power to a power grid or other load 622.

Figure 11:
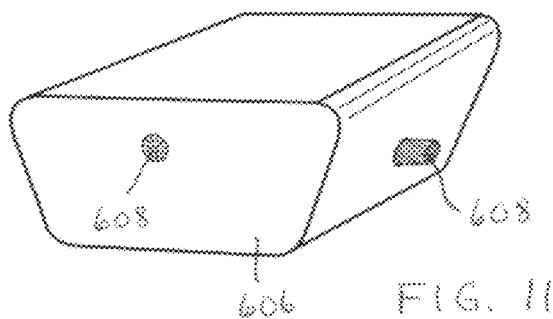
FIG. 11 illustrates the blocks used to hold the bladder of the energy storage system of FIG. 10.

Referring to FIGS. 10 and 11 in conjunction, in many instances, it may be necessary to anchor bladder 600 in place with deeply buried cables or with many tons of rock or concrete that will prevent the bladder from being merely pushed aside during a flooding event. In one embodiment, a steel cable 608 is threaded through blocks 606 and attached to an anchor 610 to retain bladder 600 in position. Anchor 610 may be a large, multi-ton block of concrete or a similar material. As best illustrated in FIG. 11, blocks 606 may have a cross-section in the form of a truncated "V" such that the blocks may move freely in a vertical direction as bladder 600 is inflated and deflated. One or more of blocks 606 may also be slidably engaged on cable 608 to permit limited lateral movement as bladder 600 is inflated and deflated. Netting 604 may also serve to prevent blocks 606 and/or any other materials used as a shield for bladder 600 from being stripped away by erosion during flooding events.

Figure 12:
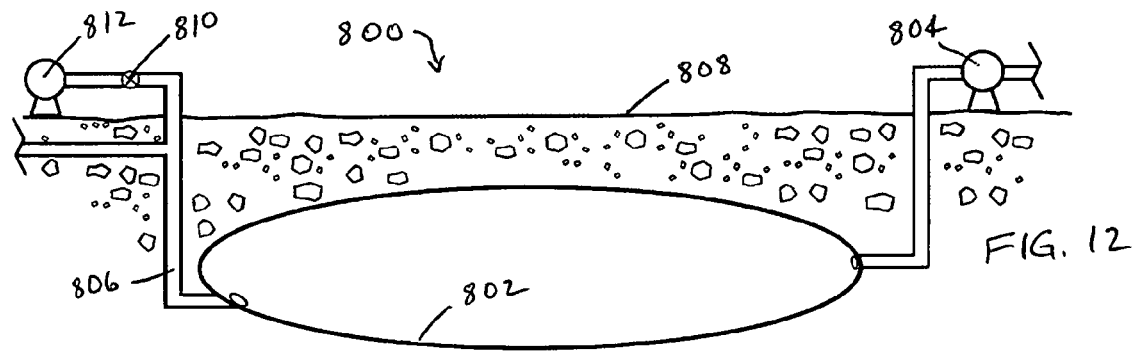
FIG. 12 illustrates the use of an energy storage bladder of the disclosure wherein the bladder is used as a municipal water source.

Referring now to FIG. 12, in another embodiment, a water and energy storage system 800 includes a large bladder 802 similar or identical to bladder 100 of FIG. 1. In this embodiment, bladder 802 may replace or supplement the conventional water tower used by many municipalities to supply water to residents. Water from some source is pumped into bladder 802 with a pump 804 and stored under pressure until withdrawn through outlet pipe 806 for distribution to consumers. Bladder 802 may be placed, for example, under a municipal park 808, in a flood plain or other suitable area. In this manner, the same concept described in connection with FIG. 1, (e.g. mass on top of a buried bladder) may be applied on small scale to domestic or off-grid applications, and on large scale as a source of pressurized municipal water. In the event of a power failure, water from bladder 800 may be diverted by means of a valve 810 to a generator 812 to generate electric power. The out-flowing water, after flowing through generator 812 and generating power, can then be directed into the public water supply to supply water to residents during the power outage.

Referring still to FIG. 12, system 800 may prove less expensive than a conventional water tower, and/or more aesthetically pleasing. System 800 provides a source of pressurized water that will remain operable in the event of the failure of regular electric supplies and can also be a source of electricity when the regular power grid has failed.

Figure 13:
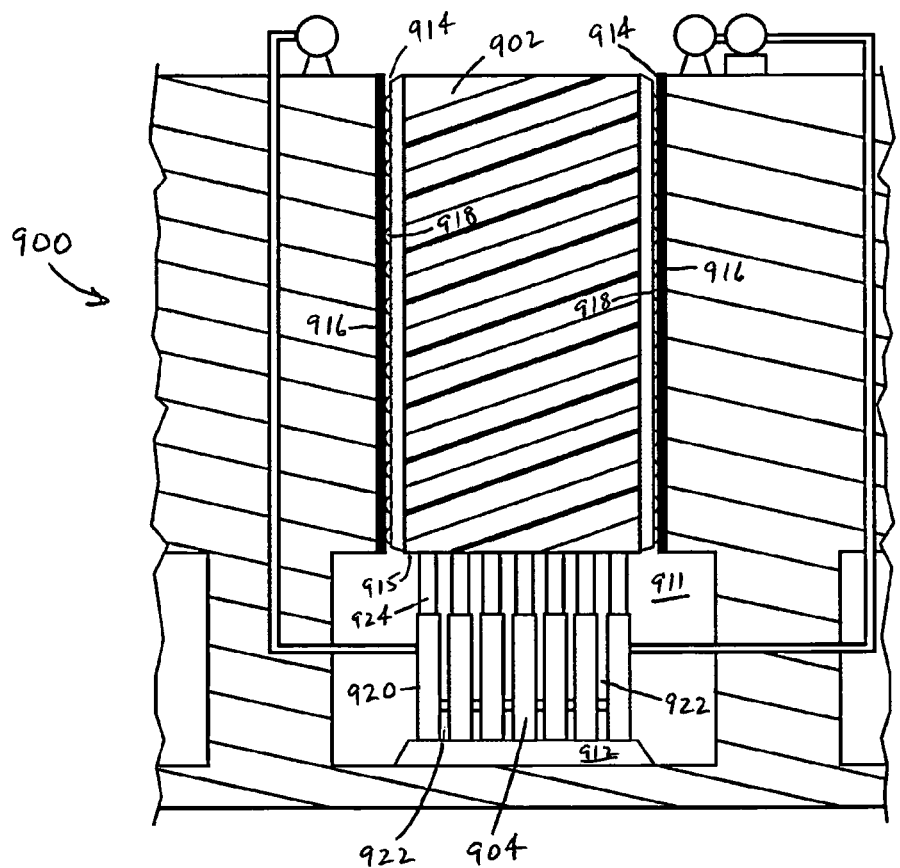
FIG. 13 illustrates a side sectional view of an energy storage device employing a plurality of hydraulic cylinders and a large monolith.

Turning to FIG. 13, in another embodiment of this invention, an energy storage system 900 includes a giant monolith 902 comprising a very large mass of earth, stone, or the like that may be raised and lowered on top of a plurality of hydraulic cylinders 904. As a fluid is pumped into cylinders 904 with pump 906, monolith 902 is raised and energy is stored as gravitational potential energy. Power to drive pump 906 may come from any conventional or non-convention source. Later, when the energy is needed, the fluid will be allowed to flow out of the cylinders to a hydraulic motor 908. This fluid flow may be used to drive a generator 910 to generate electricity or drive hydraulically powered equipment or do any other work that flowing fluid can do.

In order to implement system 900, a large chamber 911 is found or created deep underground. The floor and ceiling of the chamber are smoothed as necessary and footings 912 and ceiling plates 915 are placed to accommodate a large array of hydraulic piston cylinders 904. The plurality of cylinders 904 are placed and raised so as hold up the ceiling of the chamber underneath the location where the monolith 902 will eventually be cut loose from the surrounding soil or stone. Each cylinder 904 will be set parallel to the others and the cylinders will be selected to have sufficient capacity to lift monolith mass 902.

Figure 15:
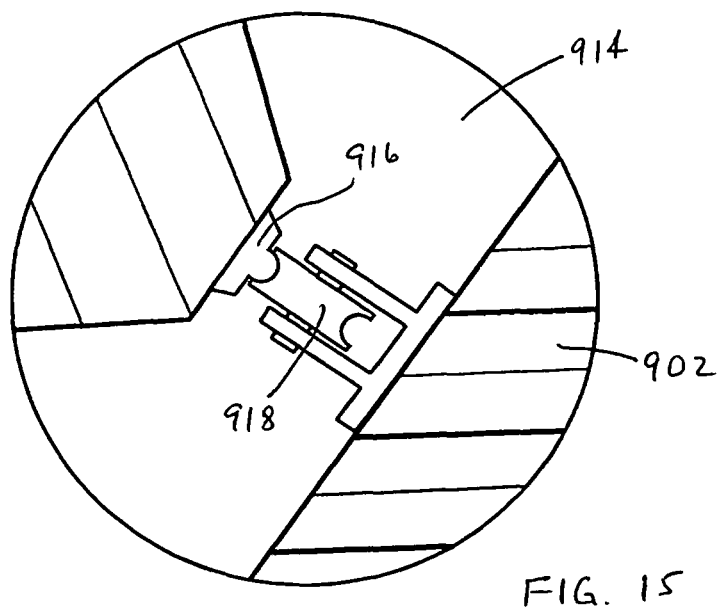
FIG. 15 shows a detailed view of part of the energy storage device shown in FIG. 14.

Referring to FIG. 13 and the detailed FIG. 15, in one variation, a series of three or more large bore deep access wells 914 are bored into bedrock such that they align with the corners of underground chamber 911 and the corners of the monolith 902 (once it is cut free from the bedrock). Rail tracks 916 are laid vertically up and down vertical access wells 914 such that, eventually, the monolith will be able to run straight up and down along the rails with railroad wheels 918 once the monolith is cut free. A quarrying process is implemented using a series of looped or reciprocating cutting cables that will cut the sides of the monolith free from the bedrock.

Cylinders 904 placed underneath monolith 902 may then be used to raise and lower the mass as described above to store and retrieve energy.

Figure 14:
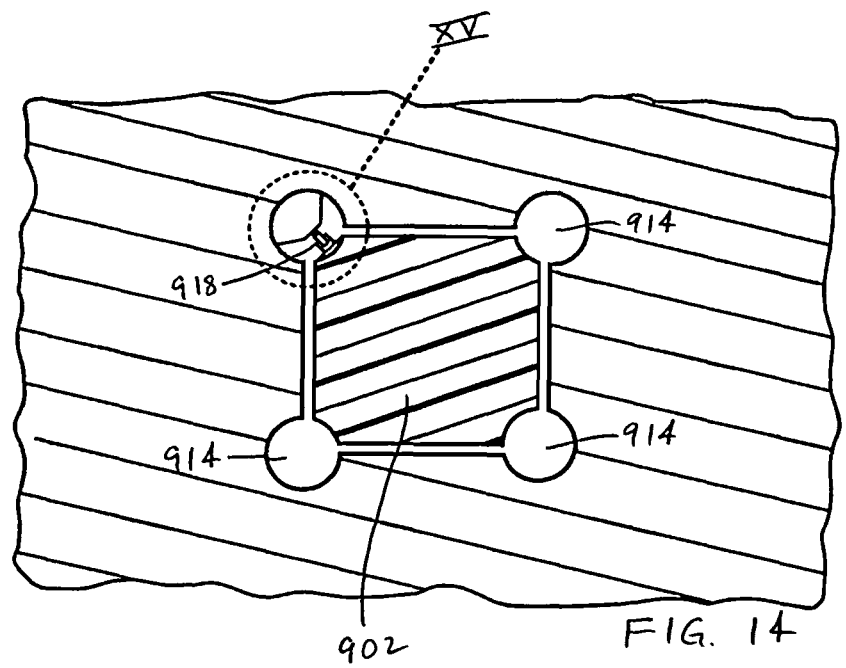
FIG. 14 illustrates a top sectional view of the energy storage device shown in FIG. 13.

FIG. 14 is a top view of the system of FIG. 13, further illustrating the configuration of the system. As illustrated, deep access wells 914 are located at the corners of monolith 902 with wheels 918 mounted on the monolith such that the monolith may move up and down on cylinders 904. Monolith 902 is shown in FIG. 14 as having a rectangular section. However, it is contemplated that the monolith 902 may have a different geometry, such as circular, triangular, hexagonal, or any other suitable shape. In FIG. 14, the wheels 918 and track 916 are shown only in the top left corner, but they would actually be placed in each of the four corners 914.

Energy storage and energy retrieval operations may begin with off-peak excess electric or mechanical power, such as hydroelectric, being used to pressurize cylinders 904 and lift monolith 902 and then, when a peak load period occurs, the fluid in the cylinders can be released, lowering the cylinders and the monolith as the fluid therein flows out. The pressurized hydraulic fluid exiting the cylinders may be used to drive hydraulic motor 908 and power electric generators 910 which generate electricity that can be utilized locally or fed into the power grid. Fluid exiting the cylinders under the pressure of the monolith can be used for any useful purpose that one can find for flowing fluid.

In one embodiment, cylinders 904 may be formed from thin-walled high-strength steel liners 920 arranged in an array. The space between pistons 904 may be filled in with high-strength material 922 such as concrete or epoxy, or a high-strength epoxy concrete hybrid to support liners 920. The push rod portion 924 of hydraulic pistons 904 can be filled with high-strength concrete instead of being made of solid steel. The top and bottom of each piston will be a threaded steel insert cap. Preferably, to ensure that the concrete always remains in equal compression it will be made of a mixture such that it expands slightly as it dries in a carefully controlled manner. It should be formulated such that it does not expand so much that it causes distortion in walls 920 of the steel cylinders.

Figure 16:
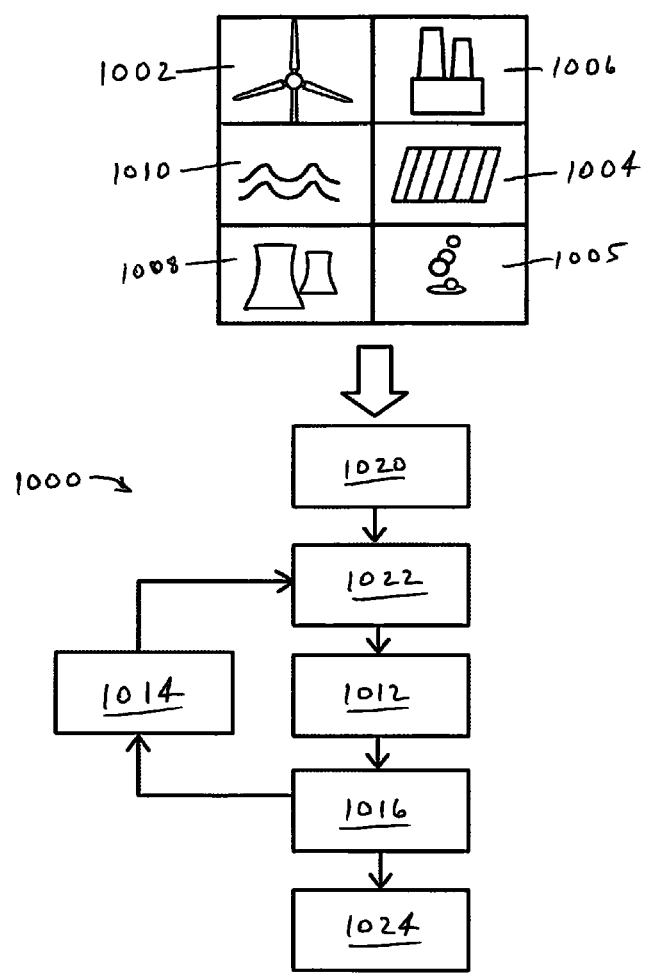
FIG. 16 illustrates an energy generation and storage system utilizing a plurality of different energy sources and underground bladders for storing energy.
Figure 17:
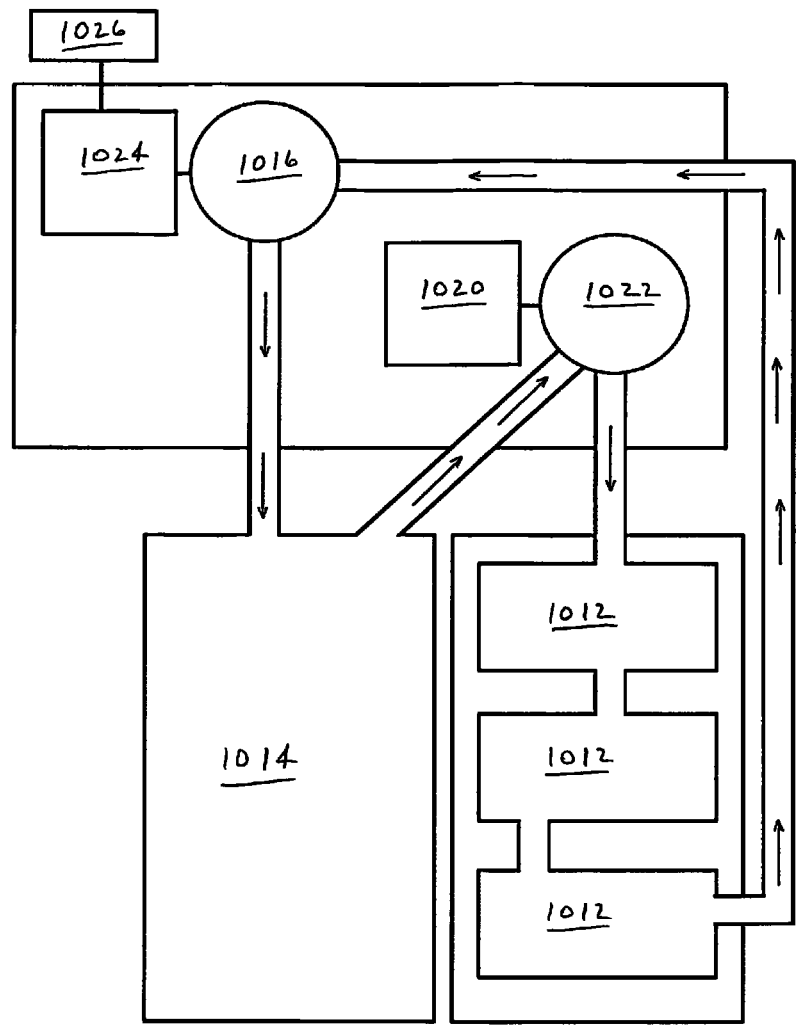
FIG. 17 illustrates an energy generation and storage system utilizing plural bladders.

Referring now to FIGS. 16 and 17, in one embodiment, an energy generating and storage system 1000 may include various power sources such as wind turbine(s) 1002, an array of solar cells 1004, geothermal sources 1005, coal, oil or natural gas fired plants 1006 and/or nuclear power plants 1008. Power recovered from tidal and wave sources 1010 may also be used. During off-peak periods, power from the various sources is used to power an electric motor 1020 that drives pump 1022 to pump a compressible or non-compressible fluid into one or more bladders 1012 such as bladder 100 described in connection with FIG. 1. In one variation, the fluid may be water, pumped from a reservoir 1014 such as a lake, river, stream or cooling pond. In other variations, a compressible fluid such as air or another gas may be used to inflate bladder 1012.

Referring still to FIGS. 16 and 17, pressurized fluid from one or more pressurized bladders 1012 may be used to power a hydraulic motor and/or water turbine 1016, which in turn drives a generator 1024 to generate electricity in peak-load periods, or power hydraulically operated equipment. From generator 1024, power can be supplied to a standard power grid 1026 or any other power transmission means. In other variations, pressurized fluid from bladder 1012 may be used to power a hydraulic motor 1016 which in turn drives an air compressor (in place of generator 1024) to produce compressed air for use with pneumatically powered tools.

There are many known means of converting a flow of fluid, whether liquid or gas, into another form or energy. There are also many known means of converting a flow of fluid, whether liquid or gas, directly into work or movement. In this specification, all embodiments that contemplate providing a flow of fluid can be used for any such means, and all such uses come within the scope of this invention. While this specification has disclosed plural embodiments of this invention, persons of ordinary skill, having learned of this invention, will be able to devise other embodiments that come within the scope of this invention.

We claim:

1. A method of storing and retrieving energy comprising:
    injecting a compressible or incompressible fluid into a flexible underground bladder to store energy wherein fluid in the bladder is pressurized with overfill; and directing fluid from the bladder to one of a hydraulic motor, air motor or turbine to generate power.

2. Apparatus for storing energy and subsequently retrieving at least some of the stored energy, comprising:
    1) an expandable receptacle having at least one port;
    2) a quantity of overfill disposed over the expandable receptacle;
    3) a source of liquid;
    4) a pump means for controllably pumping liquid from the source of liquid into the expandable receptacle such that the expandable receptacle expands and lifts the overfill;
    5) a generator means for converting liquid flow to electrical power and transmitting the electrical power to a load;
    6) a liquid flow means for alternatively
        a) flowing liquid from the source of liquid into the expandable receptacle in cooperation with the controllable pump means,
        b) holding liquid in the expandable receptacle, or
        c) flowing liquid from the expandable receptacle to the generator means.

3. The apparatus of claim 2 wherein the overfill is at least one of dirt, sand, clay, rock, stones, concrete rubble, brick rubble, scrap metal, garbage, and water.

4. The apparatus of claim 2 wherein the liquid is a hydraulic liquid.

5. The apparatus of claim 2 wherein the liquid is water.

6. The apparatus of claim 2 wherein the expandable receptacle comprises plural expandable receptacles each expandable receptacle having at least one port, wherein each of the plural expandable receptacles are interconnected by water flow means connected to at least one port of each of the plural expandable receptacles.

7. A method of storing energy and subsequently retrieving at least some of the stored energy, comprising the steps of:
    1) flowing a liquid from a source of liquid to an expandable receptacle, wherein the receptacle is at least partially disposed under overfill, until the volume of liquid within the receptacle causes the receptacle to expand and lift the overfill;
    2) maintaining the liquid within the receptacle until such time as the stored energy is to be retrieved, and subsequently flowing the liquid from the receptacle to a generator means for converting liquid flow to electrical power; and
    3) transmitting the electrical power generated by the generator means to a load.

8. The method of storing energy and subsequently retrieving at least some of the stored energy, comprising the steps of:
    1) covering a collapsed flexible bladder with an overfill;

2) subsequently, pumping a fluid into a bladder in an amount sufficient to place the fluid in the bladder under pressure higher than the ambient pressure;
3) subsequently, allowing the pressure on the fluid in the bladder to pump the fluid out of the bladder; and
4) directing the fluid pumped out of the bladder through at least one of a turbine, a Pelton Wheel, and a hydraulic motor.

9. An apparatus for making a large flexible bladder at the location where it will be used, comprising:
1) two parallel twin-rail tracks wherein the two tracks are separated by a distance greater than the width of the bladder to be constructed;
2) a first and a second rail car with rail-wheels for engaging the twin-rail tracks, wherein the first rail car is disposed on one twin-rail track and the second rail car is disposed on the other parallel twin-rail track;
3) wherein each of the first and second rail cars have a superstructure mounted on them that extends upwards;
4) a gantry with two ends, the first end of the gantry attached near the top of the superstructure of the first rail car and the second end of the gantry attached near the top of the superstructure of the second rail car;
5) at least one nozzle means for spraying a polymer, or a combination of polymer and binder, disposed on the gantry; and
6) at least one reel means, disposed on the gantry, for laying down one of a long filament and a mesh.

10. An apparatus for controlling a stream of moving water comprising
1) a large expandable receptacle having at least one means for flowing water in and out of the receptacle, wherein the receptacle is disposed adjacent one side of the stream of moving water;
2) an overfill disposed on top of the expandable receptacle;
3) plural interlocking blocks disposed on top of or within the overfill, each of the blocks having at least one hole through them;
4) at least one cable laced through the holes of plural blocks wherein at least one end of each cable is attached to a means for anchoring the cable to the ground; and
5) a means for pumping water into the expandable receptacle, and a means for either holding the water within the receptacle or allowing it to flow out of the receptacle.

11. The apparatus means of claim 10 wherein the means for controlling a stream of moving water is used to control tidal surges and storm surges.

12. The apparatus for controlling a stream of moving water of claim 10 further comprising a means for directing water flowing out of the receptacle through a hydraulic motor to generate power when water flows through the hydraulic motor.

13. A method for supplying both electrical power and water to a municipality during a power outage, comprising the steps of pumping water into a flexible bladder disposed underground such that the ground over the bladder pressurizes the water in the bladder, storing water in the pressurized bladder, and then, when power is out in the municipality, flowing water from the bladder through a means for generating electrical power, and then flowing the water into the municipality's water distribution system.

14. Apparatus for storing energy and subsequently retrieving at least some of the stored energy, comprising:
1) a cavity in the ground, the cavity having at least one generally vertical cavity wall;
2) at least one hydraulic jack disposed at the bottom of the cavity with each hydraulic lack comprising:
   a) a hydraulic cylinder disposed at the bottom of the cavity in the ground,
   b) a piston disposed at least partially within the hydraulic cylinder,
   c) means for controllably flowing hydraulic fluid into and out of each hydraulic cylinder of each jack to cause the lack's piston to respectively extend or retract into the cylinder and for controllably maintaining the hydraulic fluid in each lack constant;
3) a relatively large mass disposed in the cavity in the ground and supported above the bottom of the cavity by the piston of each of the at least one hydraulic jack;
4) plural vertical rail tracks on one of the mass or the cavity walls, and plural rail wheels on the other of the mass or the cavity walls, such that the rail wheels cooperate with the rail tracks to guide the passage of the mass up or down the cavity in the ground; and
5) means for converting hydraulic fluid flow from each hydraulic cylinder to at least one of rotational energy and electrical power.

15. A method for storing energy from an unreliable or intermittent source of power and subsequently using the stored energy, comprising the steps of:
1) utilizing the unreliable or intermittent source of power to pump a fluid into a bladder such that a gravitational load on the bladder is lifted thereby creating potential energy, and
2) subsequently allowing the gravitational load on the bladder to force the fluid to flow from the bladder, whereby the potential energy stored in the lifted gravitational load is converted to kinetic energy in the form of fluid flow.

16. The method of claim 15 wherein the unreliable or intermittent source of power is at least one of wind power, geothermal power, solar power, tidal power, and wave current power.

17. The method of claim 15 wherein the unreliable or intermittent source of power is a power plant powered by at least one of coal, oil, natural gas, nuclear fission, nuclear fusion, and hydro-electric power.

* * * * *